(12) United States Patent
Tailor et al.

(10) Patent No.: US 9,813,341 B1
(45) Date of Patent: Nov. 7, 2017

(54) SYSTEMS AND METHODS FOR ROUTING DATA TRAFFIC BASED ON NETWORK CONDITIONS

(71) Applicant: Sprint Spectrum LP, Overland Park, KS (US)

(72) Inventors: Pinal Tailor, Ashburn, VA (US); Kafi Hassan, Fairfax, VA (US); Greg Keller, Sterling, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 37 days.

(21) Appl. No.: 14/303,112

(22) Filed: Jun. 12, 2014

(51) Int. Cl.
| | |
|---|---|
| *H04L 12/803* | (2013.01) |
| *H04L 12/801* | (2013.01) |
| *H04W 92/04* | (2009.01) |
| *H04W 92/20* | (2009.01) |

(52) U.S. Cl.
CPC ............ *H04L 47/125* (2013.01); *H04L 47/12* (2013.01); *H04L 47/122* (2013.01); *H04L 47/14* (2013.01); *H04W 92/045* (2013.01); *H04W 92/20* (2013.01)

(58) Field of Classification Search
CPC ..... H04L 47/125; H04L 12/66; H04L 1/0026; H04L 65/1069; H04L 65/1016; H04L 65/1063; H04W 36/00; H04W 4/00; H04W 72/00; H04W 36/0072; H04W 40/02; H04W 76/022; H04W 8/20; H04W 36/0055; H04W 36/0011; H04W 48/16; H04W 76/062; H04W 92/20; H04W 36/08; H04W 92/045; G01R 31/08; G06F 15/173; H04M 3/00

See application file for complete search history.

(56) References Cited

U.S. PATENT DOCUMENTS

| | | | |
|---|---|---|---|
| 8,363,619 B2 | 1/2013 | Zhang et al. | |
| 8,625,582 B2* | 1/2014 | Hegde | H04W 40/02 370/237 |
| 2011/0280127 A1* | 11/2011 | Raaf | H04L 45/125 370/230 |
| 2013/0034043 A1* | 2/2013 | Yu | H04W 72/085 370/315 |

* cited by examiner

*Primary Examiner* — Jae Y Lee
*Assistant Examiner* — Aixa Guadalupe-Cruz

(57) ABSTRACT

Systems and methods are described for routing data traffic based on network conditions. Network conditions for a communication network may be monitored, where the communication network comprises a first access node and a second access node that are in communication using a first communication link and a second communication link. The monitored network conditions may include at least a utilization of the second communication link. It may be determined that the network conditions meet a criteria. A first classification may be assigned to a message when it is determined that the network conditions meet the criteria. The first access node may be instructed to transmit the message over the first communication link based on the first classification when the network conditions meet the criteria and to transmit the message over the second communication link when the network conditions fail to meet the criteria.

20 Claims, 7 Drawing Sheets

SYSTEMS AND METHODS FOR ROUTING DATA TRAFFIC BASED ON NETWORK CONDITIONS

TECHNICAL BACKGROUND

Telecommunication systems, such as cellular networks or other wireless networks, use various network links throughout the network to communicate. For example, an access node may use a network link to communicate with another access node while using a separate network link to communicate with another processing node. Accordingly, the system may rely on a well-established network to provide efficient communication services.

In certain circumstances, a portion of the network may experience high load (e.g., load above a threshold). For example, a communication link may experience large amount of data traffic. Here, the efficiency of the system may suffer due to excessive load on a portion of the system. Accordingly, a system that effectively balances load may be able to provide a high quality service to users of the system.

OVERVIEW

Systems and methods are described for routing data traffic based on network conditions. Network conditions for a communication network may be monitored, where the communication network comprises a first access node and a second access node that are in communication using a first communication link and a second communication link. The monitored network conditions may include at least a utilization of the second communication link. It may be determined that the network conditions meet a criteria. A first classification may be assigned to a message when it is determined that the network conditions meet the criteria. The first access node may be instructed to transmit the message over the first communication link based on the first classification when the network conditions meet the criteria and to transmit the message over the second communication link when the network conditions fail to meet the criteria.

DETAILED DESCRIPTION

Figure 1:
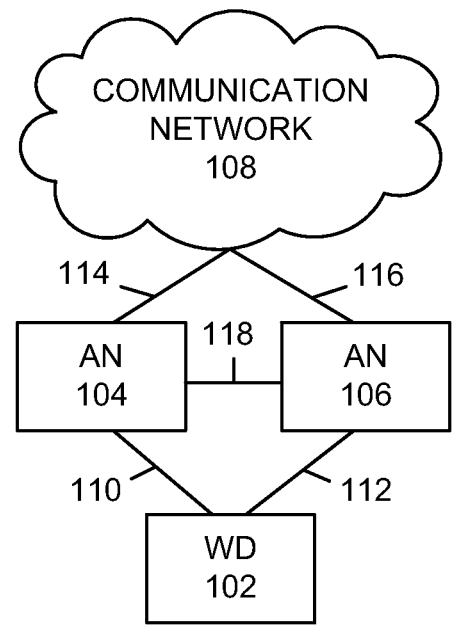
FIG. 1 illustrates an exemplary communication system to route data traffic based on network conditions.

FIG. 1 illustrates an exemplary communication system 100 to route data traffic based on network conditions comprising wireless device 102, access nodes 104 and 106, communication network 108, and communication links 110, 112, 114, 116, and 118. Other network elements may be present in the communication system 100 to facilitate communication but are omitted for clarity, such as controller nodes, base stations, base station controllers, gateways, mobile switching centers, dispatch application processors, and location registers such as a home location register or visitor location register. Furthermore, other network elements may be present to facilitate communication between access node 104, access node 106, and communication network 108 which are omitted for clarity, including additional processing nodes, routers, gateways, and physical and/or wireless data links for carrying data among the various network elements.

Wireless device 102 can be any device configured to communicate over communication system 100 using a wireless communication link. For example, wireless device 102 can include a cell phone, a smart phone, a computing platform such as a laptop, palmtop, or a tablet, a personal digital assistant, or an internet access device, and combinations thereof. It is noted that while one wireless device is illustrated in FIG. 1 as being in communication with each of access nodes 104 and 106, any number of wireless devices can be implemented.

Access nodes 104 and 106 are network nodes capable of providing wireless communications to wireless device 102, and can be, for example, a base transceiver station, a radio base station, an eNodeB device, or an enhanced eNodeB device. Access nodes 104 and 106 may communicate with communication network 108 over communication links 114 and 116. Access nodes 104 and 106 may also communicate directly with each other over communication link 118. In an embodiment, access node 104 can comprise a serving access node for wireless device 102.

Although only two access nodes 104 and 106 are illustrated in FIG. 1, wireless device 102 can be in communication with a plurality of access node. The plurality of access nodes can be associated with different networks and can support different communication protocols and radio access technologies.

Communication network 108 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 108 can be capable of carrying voice information and other information, for example, to support communications by a wireless device such as wireless device 102. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 108 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 108 may also comprise a wireless network, including base stations, wireless communication nodes, telephony switches, internet routers, network gateways, computer systems, communication links, or some other type of communication equipment, and combinations thereof.

Communication links 110, 112, 114, 116, and 118 can be wired or wireless communication links. Wired communication links can comprise, for example, twisted pair cable, coaxial cable or fiber optic cable, or combinations thereof.

Wireless communication links can comprise a radio frequency, microwave, infrared, or other similar signal, and can use a suitable communication protocol, for example, GSM, CDMA, UMTS, HSPA, EV-DO, WiMAX, or 3GPP LTE, or combinations thereof. Other wireless protocols can also be used.

Figure 2:
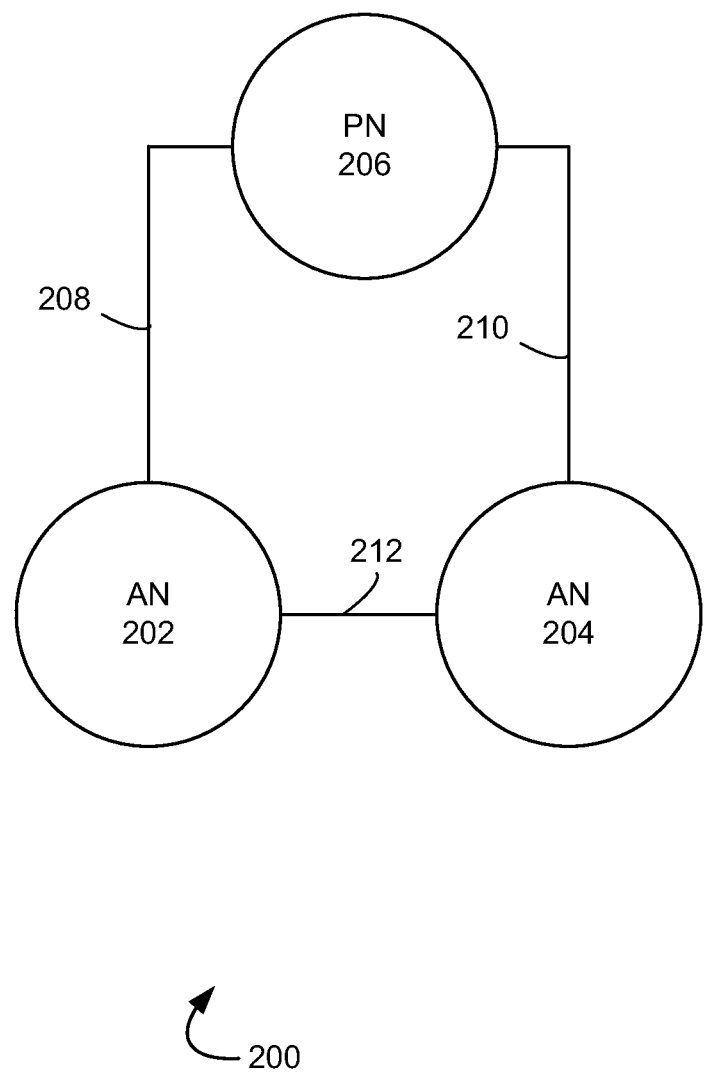
FIG. 2 illustrates another exemplary system to route data traffic based on network conditions.

FIG. 2 illustrates an exemplary communication system 200 for routing data traffic based on network conditions. System 200 comprises access nodes 202 and 204, processing node 206, and communication links 208, 210, and 212. Access nodes 202 and 204 may comprise access nodes similar to access node 104 of FIG. 1. Processing node 206 may comprise an access node, controller node, gateway node, or any other processing node as described herein. Communication links 208, 210, and 212 may comprise a communication link similar to communication link 118 of FIG. 1.

In operation, access node 202 may establish communication with a plurality of wireless devices such that access node 202 provides the wireless devices access to a communication network (such as communication network 108, illustrated in FIG. 1). Access node 202 may communicate with access node 204 and processing node 206. For example, access node 202 may share load information with access node 204 in order to perform load balancing or may communicate with access node 204 in order to perform a handover of a wireless device. In addition, processing node 206 may comprise a controller node, and access node 202 may communicate with processing node 206 in order to update configuration information at the access node (e.g., a neighbor relations table, tracking area information, and the like).

In an embodiment, communication link 212 may comprise an X2 communication link between access nodes. Accordingly, messages may be transmitted between access node 202 and access node 204 over the X2 communication link. In addition, communication links 208 and 210 may comprise S1 links between an access node and a processing node (e.g., controller node, gateway node, and the like). Accordingly, messages may be transmitted between access node 202 and processing node 206 over the S1 communication link (e.g., communication link 208) and messages may be transmitted between access node 204 and processing node 206 over the S1 communication link (e.g., communication link 210).

In an embodiment, conditions at one or more of access node 202 and access node 204 may cause a high utilization (e.g., utilization above a threshold) of communication link 212. For example, where a plurality of messages are passed back and forth about load balancing, handovers, and the like, communication link 212 may experience significant traffic. Accordingly, a system to route traffic over the communication links of system 200 would enhance overall efficiency.

Systems and methods are described for routing data traffic based on network conditions. Network conditions for a communication network may be monitored, where the communication network comprises a first access node and a second access node that are in communication using a first communication link and a second communication link. The monitored network conditions may include at least a utilization of the second communication link. It may be determined that the network conditions meet a criteria. A first classification may be assigned to a message when it is determined that the network conditions meet the criteria. The first access node may be instructed to transmit the message over the first communication link based on the first classification when the network conditions meet the criteria and to transmit the message over the second communication link when the network conditions fail to meet the criteria.

Figure 3:
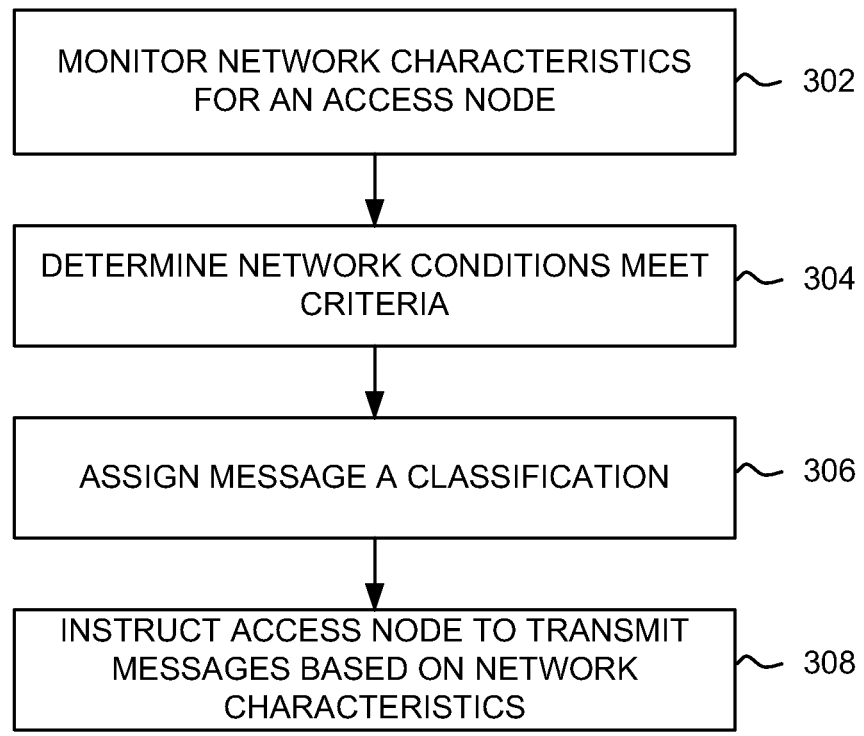
FIG. 3 illustrates an exemplary method of routing data traffic based on network conditions.

FIG. 3 illustrates an exemplary method for routing data traffic based on network conditions. The method will be discussed with reference to the exemplary communication system 200 illustrated in FIG. 2, however, the method can be implemented with any suitable communication system.

Referring to FIG. 3, at step 302, network conditions for an access node may be monitored. For example, network conditions for access node 202 may be monitored. The network conditions may comprise a ratio of the utilization of communication link 212 to a utilization of data bearer channels between access node 202 and a plurality of wireless devices in communication with access node 202. In another example, the network conditions may comprise a number of communication links that communicatively link access nodes in the communication system (e.g., a number of X2 communication links). In another example, the network conditions may comprise one or more of a data utilization for the access node 202, a resource block utilization for access node 202, a number of connections to wireless devices for access node 202, a mobility for the wireless devices in communication with access node 202, and a handover failure number for access node 202 (e.g., handover failure rate). In an embodiment, the network conditions may comprise conditions for access node 204 that are similar to those conditions described above for access node 202 (e.g., utilization ratio, resource block utilization, number of connections, mobility for wireless devices, handover failure number, and the like).

At step 304, it is determined that the monitored network conditions meet a criteria. For example, one or more of the network conditions monitored at step 302 may be compared to a criteria, and it may be determined that the network conditions meet the criteria. For example, the network conditions may comprise a utilization of communication link 212 and the criteria may comprise a threshold utilization. Here, if the utilization of communication link 212 exceeds the threshold utilization, it may be determined that the monitored network conditions meet the criteria.

At step 306, a first classification may be assigned to a message when it is determined that the network conditions meet the criteria. For example, a message from access node 202 to access node 204 may be assigned a first classification. In an embodiment, the message may be assigned a classification based on a message type for the message.

At step 308, the first access node may be instructed to transmit the message over the first communication link based on the first classification when the network conditions meet the criteria and to transmit the message over the second communication link when the network conditions fail to meet the criteria. For example, when the network conditions meet the criteria, access node 202 may be instructed to transmit the message over communication link 208 based on the assigned first classification for the message. In an embodiment, processing node 206 may relay the message transmitted over communication link 208 to access node 204 over communication link 210. When the network conditions fail to meet the criteria, access node 202 may be instructed to transmit the message over communication link 212.

Figure 4:
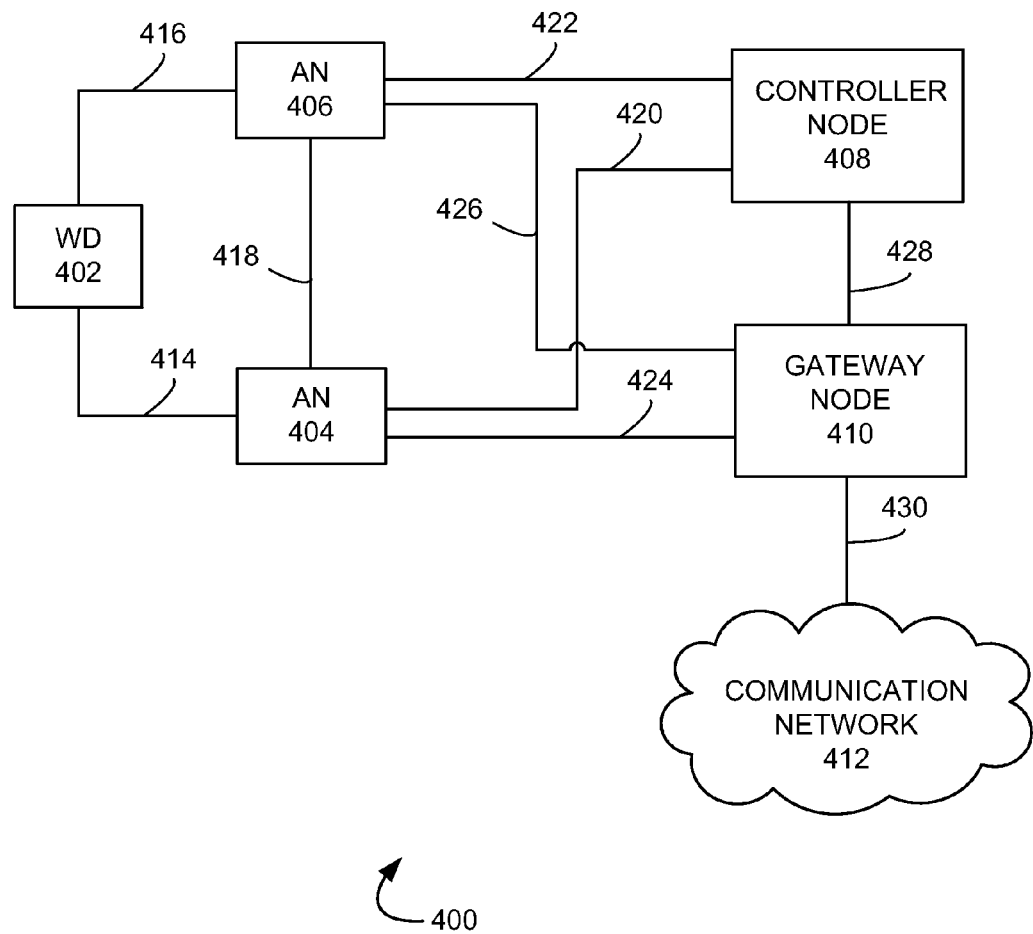
FIG. 4 illustrates another exemplary system to route data traffic based on network conditions.

FIG. 4 illustrates another exemplary communication system 400 to route data traffic based on network conditions. Communication system 400 may comprise a wireless device 402, access nodes 404 and 406, controller node 408, gateway node 410, communication network 412, and communication links 414, 416, 418, 420, 422, 424, 426, 428, and 430. Other network elements may be present in the communication system 400 to facilitate communication but are omitted for clarity, such as base stations, base station controllers, gateways, mobile switching centers, dispatch application processors, and location registers such as a home location register or visitor location register.

Wireless device 402 can be any device configured to communicate over communication system 400 using a wireless communication link. For example, wireless device 402 can include a cell phone, a smart phone, a computing platform such as a laptop, palmtop, or a tablet, a personal digital assistant, or an internet access device, and combinations thereof.

Access nodes 404 and 406 are network nodes capable of providing wireless communications to wireless device 402, and can be, for example, a base transceiver station, a radio base station, an eNodeB device, or an enhanced eNodeB device. In an embodiment, access node 404 can comprise a serving access node for wireless device 402. Access nodes 404 and 406 may communicate with controller node 408 over communication links 420 and 422, and with gateway node 410 over communication links 424 and 426. Access nodes 404 and 406 may also communicate directly with each other over communication link 418.

Controller node 408 can be any network node configured to manage services within system 400. Controller node 408 may provide other control and management functions for system 400. The controller node 408 can be a single device having various functions or a plurality of devices having differing functions. For example, controller node 408 can include at least one of a multi-cell/multicast coordination entity (MCE), a mobility management entity (MME), a radio network controller (RNC), a mobile switching center (MSC), and a combination thereof.

Controller node 408 can comprise a processor and associated circuitry to execute or direct the execution of computer-readable instructions to obtain information. Controller node 408 can retrieve and execute software from storage, which can include a disk drive, a flash drive, memory circuitry, or some other memory device, and which can be local or remotely accessible. The software may comprise computer programs, firmware, or some other form of machine-readable instructions, and may include an operating system, utilities, drivers, network interfaces, applications, or some other type of software, including combinations thereof. Controller node 408 can receive instructions and other input at a user interface. Controller node 408 can comprise a processor and associated circuitry to execute or direct the execution of computer-readable instructions to obtain information.

Gateway node 410 is a network element which can comprise a processor and associated circuitry to execute or direct the execution of computer-readable instructions. Gateway node 410 may retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. In an embodiment, gateway node 410 can provide instructions to access nodes 404 and 406 related to channel selection in communications with wireless device 402. For example, gateway node 410 can comprise at least one of a serving gateway (SGW), a packet data network gateway (PDNGW), a cellular gateway (CGW), and a combination thereof.

Communication network 412 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 412 may also comprise base stations, wireless communication nodes, telephony switches, internet routers, network gateways, computer systems, communication links, or some other type of communication equipment, and combinations thereof. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 412 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM).

Communication links 414, 416, 418, 420, 422, 424, 426, 428, and 430 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in the communication system 400 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication among access nodes 404 and 406, controller node 408, gateway node 410, and communication network 412 which are omitted for clarity, including additional processing nodes, routers, gateways, and physical and/or wireless data links for carrying data among the various network elements.

Figure 5:
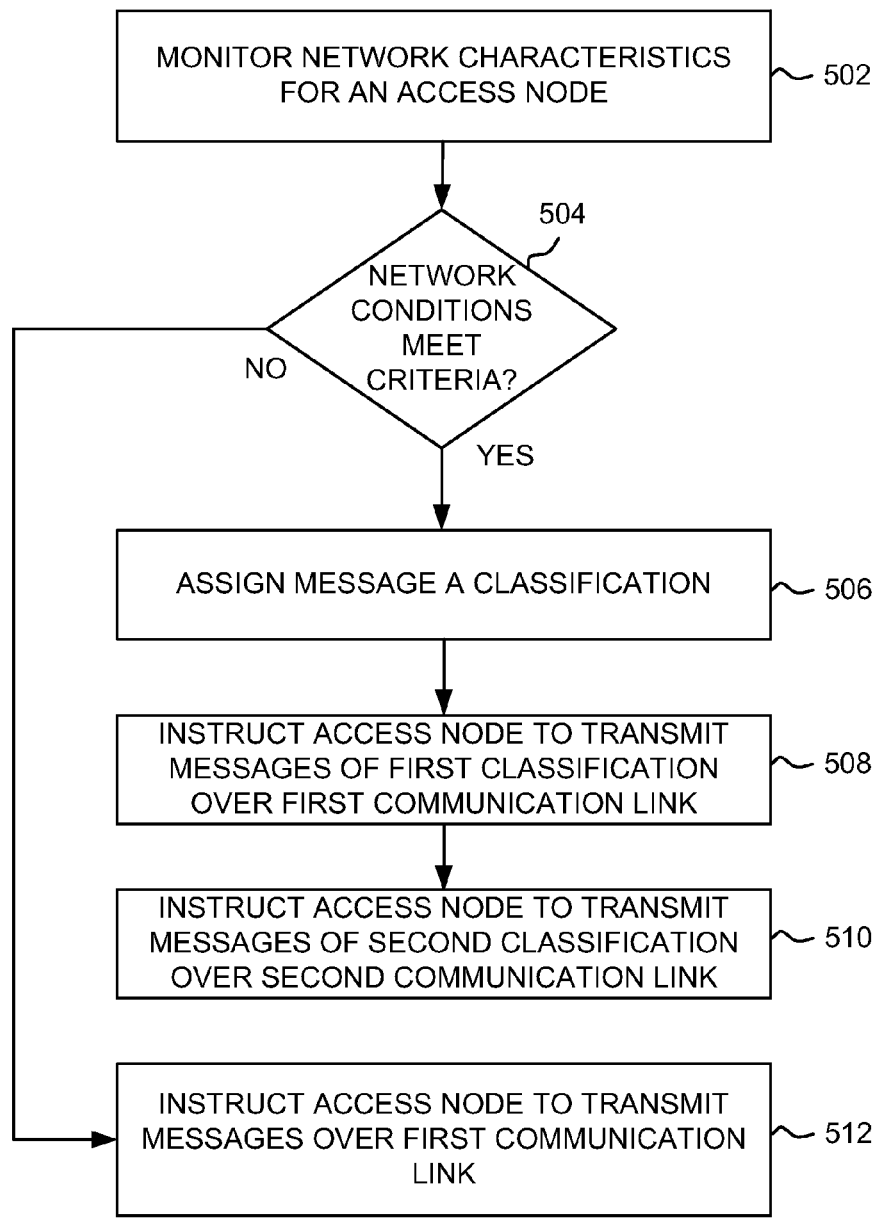
FIG. 5 illustrates another exemplary method of routing data traffic based on network conditions.
Figure 6:
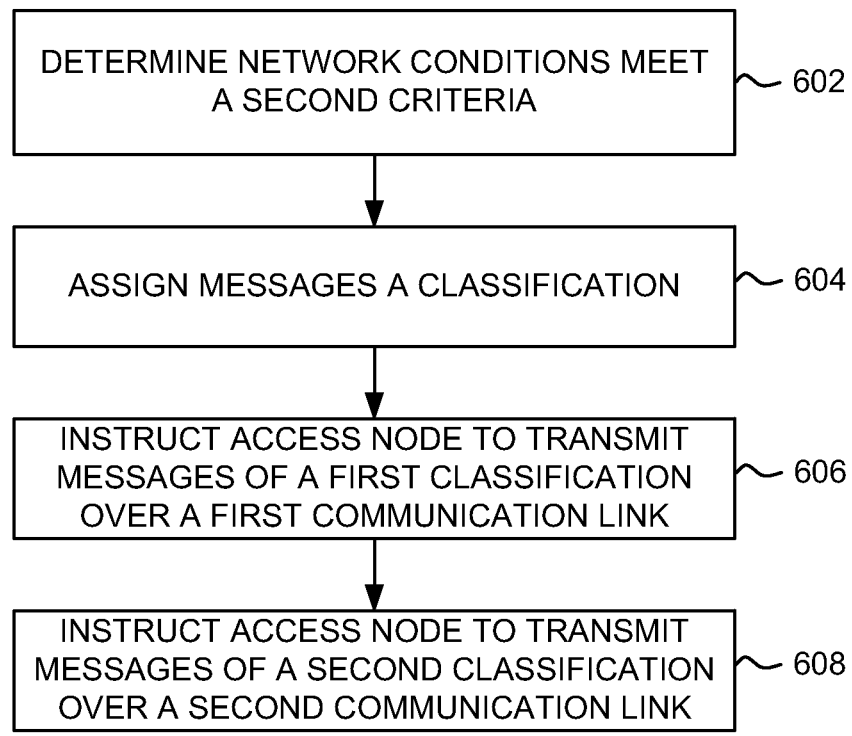
FIG. 6 illustrates another exemplary method of routing data traffic based on network conditions.

In an embodiment, any of controller node 408, gateway node 410, one or more modules of access node 404, and one or more modules of access node 406 may perform all or parts of the methods of FIGS. 3, 5, and 6. In an embodiment, processing node 206 of FIG. 2 may comprise controller node 408 or gateway node 410.

In operation, access node 404 may establish communication with a plurality of wireless devices (e.g., wireless device 402) such that access node 404 provides the wireless devices access to a communication network (such as communication network 412). Access node 404 may communicate with access node 406, controller node 408, gateway node 410. For example, access node 404 may share load information with access node 406 in order to perform load balancing or may communicate with access node 406 in order to perform a handover of a wireless device. In addition, access node 404 may communicate with controller node 408 in order to update configuration information at the access node (e.g., a neighbor relations table, tracking area information, and the like). Access node 404 may also communicate with gateway node 410 in order to send and/or receive data to and from communication network 412.

In an embodiment, communication link 418 may comprise an X2 communication link between access nodes. Accordingly, messages may be transmitted between access node 404 and access node 406 over the X2 communication link (e.g. communication link 418). In addition, communication links 420, 422, 424, and 426 may comprise S1 communication links between an access node and a processing node (e.g., controller node 408, gateway node 410, and the like). Accordingly, messages may be transmitted between access node 404 and the processing node over the S1 communication link (e.g., communication links 420 or 424) and messages may be transmitted between access node 406 and the processing node over the S1 communication link (e.g., communication links 422 or 426).

In an embodiment, conditions at one or more of access node 404 and access node 406 may cause a high utilization (e.g., utilization above a threshold) of communication link 418. For example, where a plurality of messages are passed back and forth about load balancing, handovers, and the like, communication link 418 may experience significant traffic. Accordingly, a system to route traffic over the communication links of system 400 would enhance overall efficiency.

FIG. 5 illustrates an exemplary method to route data traffic based on network conditions. The method will be discussed with reference to the exemplary communication system 400 illustrated in FIG. 4, however, the method can be implemented with any suitable communication system.

Referring to FIG. 5, at step 502, network conditions for an access node may be monitored. For example, network conditions for access node 404 may be monitored. The network conditions may comprise a ratio of the utilization of communication link 418 to a utilization of data bearer channels between access node 404 and a plurality of wireless devices in communication with access node 404. In another example, the network conditions may comprise a number of communication links that communicatively link access nodes in the communication system (e.g., a number of X2 communication links). In another example, the network conditions may comprise one or more of a data utilization for access node 404, a resource block utilization for access node 404, a number of connections to wireless devices for access node 404, a mobility for the wireless devices in communication with access node 404, and a handover failure number for access node 404 (e.g., handover failure rate). In an embodiment, the network conditions may comprise conditions for access node 406 that are similar to those conditions described above for access node 404 (e.g., utilization ratio, resource block utilization, number of connections, mobility for wireless devices, handover failure number, and the like).

At step 504, it is determined whether the monitored network conditions meet a criteria. For example, one or more of the network conditions monitored at step 502 may be compared to a criteria, and it may be determined whether the network conditions meet the criteria. For example, the network conditions may comprise a utilization of communication link 418 and the criteria may comprise a threshold utilization. Here, if the utilization of communication link 418 exceeds the threshold utilization, it may be determined that the monitored network conditions meet the criteria.

In an embodiment, the network conditions may comprise a ratio of the utilization of communication link 418 to a utilization of data bearer channels between access node 404 and a plurality of wireless devices in communication with access node 404. In another example, the network conditions may comprise a number of communication links that communicatively link access nodes in the communication system (e.g., a number of X2 communication links). In another example, the network conditions may comprise one or more of a data utilization for access node 404, a resource block utilization for access node 404, a number of connections to wireless devices for access node 404, a mobility for the wireless devices in communication with access node 404, and a handover failure number for access node 404 (e.g., handover failure rate). In an embodiment, the network conditions may comprise conditions for access node 406 that are similar to those conditions described above for access node 404 (e.g., utilization ratio, resource block utilization, number of connections, mobility for wireless devices, handover failure number, and the like). Accordingly, one or more criteria may be used such that one or more of the monitored network conditions described herein are compared to a criteria for that network condition.

When it is determined that the monitored network conditions meet the criteria, the process may proceed to step 506. At step 506, a first classification or a second classification may be assigned to a message when it is determined that the network conditions meet the criteria. For example, a message from access node 404 to access node 406 may be assigned a classification.

In an embodiment, the message may be assigned a classification based on a message type for the message. For example, messages transmitted between access node 404 and access node 406 may comprise a message type. The message types may be based on an elementary procedure that is performed using the message. Example elementary procedures include handover preparation, reset, X2 setup, node configuration update, resource status reporting initiation, mobility settings change, cell activation, load indication, handover cancel, SN status transfer, wireless device context release, resource status reporting, error indication, radio link failure, handover report, and the like. In an embodiment, a message that is used for a communication link reset, a failure report, or an error report (e.g., a message that comprises a message type for these elementary procedures) may be assigned to a first classification and a message that is used for handover preparation, load indication, or handover cancel (e.g., a message that comprises a message type for these elementary procedures) may be assigned to a second classification.

At steps 508 and 510, the first access node may be instructed to transmit messages over the first communication link based on the first classification and to transmit messages over the second communication link based on the second classification when the network conditions meet the criteria. For example, when the network conditions meet the criteria, access node 404 may be instructed to transmit messages over one of communication links 424 or 420 (e.g., an S1 communication link) based on the assigned first classification for the messages. Controller node 408 may relay messages transmitted over communication link 420 to access node 406 over communication link 422 and gateway node 410 may relay messages transmitted over communication link 424 to access node 406 over communication link 426. For instance, one of controller node 408 or gateway node 410 may relay messages to access node 406 sent from access node 404 when the messages are destined for access node 406 (e.g., addressed to access node 406).

In an example, when the network conditions meet the criteria, access node 404 may be instructed to transmit messages over communication link 418 (e.g., an X2 communication link) based on an assigned second classification for the messages. Here, message may be transmitted directly between access node 404 and access node 406 because communication link 418 links these two access nodes with a direct link (e.g., without a relay functionality needed from a controller node, gateway node, or the like). It should be noted that network elements, such as routers, relays, and the like, may exist along network link 418 and may be used to directly link access node 404 to access node 406. Accordingly, when the network conditions meet the criteria, messages of a message type that are assigned the first classification may be transmitted over one of communication links 420 or 424 (e.g., an S1 communication link) and messages of a message type that are assigned a second classification may be transmitted over communication link 418 (e.g., an X2 communication link).

Referring to FIG. 5 step 504, when it is determined that the monitored network conditions fail to meet the criteria, the process may proceed to step 512. At step 512, the first access node may be instructed to transmit messages over the second communication link when the network conditions fail to meet the criteria. For example, when the network conditions fail to meet the criteria, access node 404 may be instructed to transmit messages for access node 406 over communication link 418 (e.g., an X2 communication link) regardless of message type or message classification.

FIG. 6 illustrates an exemplary method for routing data traffic based on network conditions. The method of FIG. 6 may follow the method of FIG. 5. The method will be discussed with reference to the exemplary communication system 400 illustrated in FIG. 4, however, the method can be implemented with any suitable communication system.

At step 602, it is determined that the monitored network conditions meet a second criteria and do not meet the first criteria. For example, one or more of the network conditions monitored may be compared to a second criteria, and it may be determined that the network conditions meet the second criteria. The second criteria may comprise a different criteria from the first criteria. For example, the network conditions may comprise a utilization of communication link 418, the first criteria may comprise a first threshold utilization, and the second criteria may comprise a second threshold utilization. Here, it may be determined that the monitored utilization of communication link 418 meets the second criteria (e.g., the second threshold utilization) but does not meet the first criteria (e.g., the first threshold utilization).

In an embodiment, the network conditions may comprise a ratio of the utilization of communication link 418 to a utilization of data bearer channels between access node 404 and a plurality of wireless devices in communication with access node 404. In another example, the network conditions may comprise a number of communication links that communicatively link access nodes in the communication system (e.g., a number of X2 communication links). In another example, the network conditions may comprise one or more of a data utilization for access node 404, a resource block utilization for access node 404, a number of connections to wireless devices for access node 404, a mobility for the wireless devices in communication with access node 404, and a handover failure number for access node 404 (e.g., handover failure rate). In an embodiment, the network conditions may comprise conditions for access node 406 that are similar to those conditions described above for access node 404 (e.g., utilization ratio, resource block utilization, number of connections, mobility for wireless devices, handover failure number, and the like). Accordingly, one or more criteria may be used such that one or more of the monitored network conditions described herein are compared to a criteria for that network condition.

When it is determined that the monitored network conditions meet the second criteria and do not meet the first criteria, the process may proceed to step 604. At step 604, a first classification or a second classification may be assigned to a message when it is determined that the network conditions meet the second criteria and do not meet the first criteria. For example, a message from access node 404 to access node 406 may be assigned a classification.

In an embodiment, the message may be assigned a classification based on a message type for the message. For example, messages transmitted between access node 404 and access node 406 may comprise a message type. The message types may be based on an elementary procedure that is performed using the message. Example elementary procedures include handover preparation, reset, X2 setup, node configuration update, resource status reporting initiation, mobility settings change, cell activation, load indication, handover cancel, SN status transfer, wireless device context release, resource status reporting, error indication, radio link failure, handover report, and the like.

In an embodiment, a message that is used for a communication link reset, a failure report, or an error report (e.g., a message that comprises a message type for these elementary procedures) may be assigned to a first classification and a message that is used for handover preparation, load indication, or handover cancel (e.g., a message that comprises a message type for these elementary procedures) may be assigned to a second classification.

In an embodiment, messages may be assigned a classification at step 506 of FIG. 5 when network conditions meet a first criteria and the messages may be assigned a new classification (e.g., reclassified) at step 604 when network conditions meet a second criteria and do not meet the first criteria. For example, step 506 of FIG. 5 may assign messages a classification at a first time and step 604 of FIG. 6 may assign a new classification to messages at a second time. In this example, message may be assigned a classification based on a message type, as described herein. In an embodiment, a first message type may be assigned to the first classification when the network conditions meet the first criteria (e.g., step 506), and the first message type may be assigned to the second classification when the network conditions meet the second criteria and do not meet the first criteria (e.g., step 604). Accordingly, messages of the first message type may be assigned to the first classification when network conditions meet the first criteria, and the messages of the first message type may be assigned to the second classification (e.g., reclassified) when the network conditions meet the second criteria but do not meet the first criteria.

At steps 606 and step 608, the first access node may be instructed to transmit messages over the first communication link based on the first classification and to transmit messages over the second communication link based on the second classification when the network conditions meet the second criteria. For example, when the network conditions meet the second criteria, access node 404 may be instructed to transmit messages over one of communication links 424 or 420 (e.g., an S1 communication link) based on the assigned first classification for the messages. Controller node 408 may relay messages transmitted over communication link 420 to access node 406 over communication link 422 and gateway node 410 may relay messages transmitted over communication link 424 to access node 406 over communication link 426. For instance, one of controller node 408 or gateway node 410 may relay messages to access node 406 sent from access node 404 when the messages are destined for access node 406 (e.g., addressed to access node 406).

In an example, when the network conditions meet the second criteria, access node 404 may be instructed to transmit messages over communication link 418 (e.g., an X2 communication link) based on an assigned second classification for the messages. Here, message may be transmitted directly between access node 404 and access node 406 because communication link 418 links these two access node with a direct link (e.g., without a relay functionality needed from a controller node, gateway node, or the like). It should be noted that network elements, such as routers, relays, and the like, may exist along network link 418 and may be used to directly link access node 404 to access node 406. Accordingly, when the network conditions meet the second criteria, messages of a message type that are assigned the first classification may be transmitted over one of communication links 420 or 424 (e.g., an S1 communication link) and messages of a message type that are assigned a second classification may be transmitted over communication link 418 (e.g., an X2 communication link).

Although the methods described perform steps in a particular order for purposes of illustration, the methods discussed herein are not limited to any particular order or arrangement. One skilled in the art, using the disclosure provided herein, will appreciate that various steps of the methods can be omitted, rearranged, combined, and/or adapted in various ways.

Figure 7:
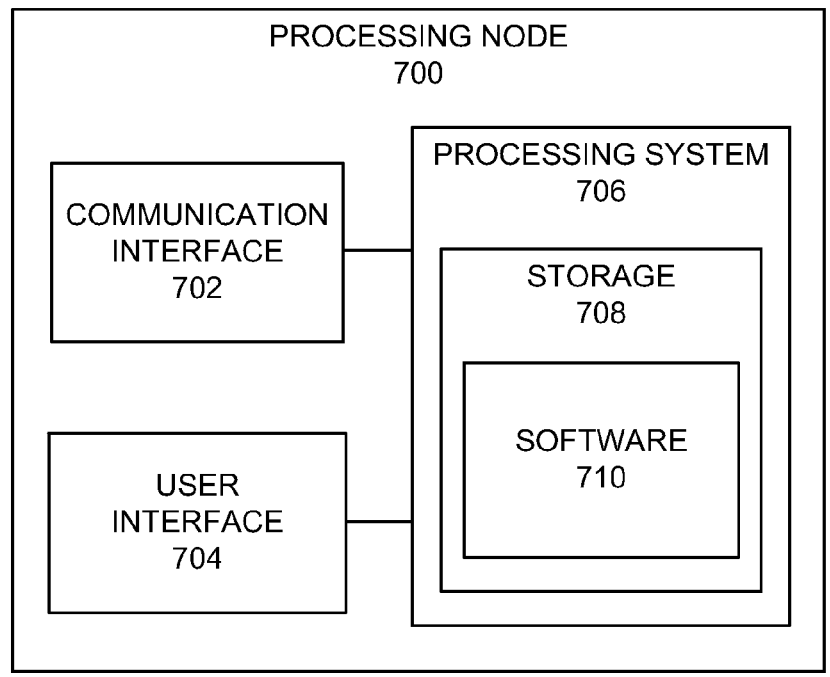
FIG. 7 illustrates an exemplary processing node.

FIG. 7 illustrates an exemplary processing node 700 in a communication system. Processing node 700 comprises communication interface 702, user interface 704, and processing system 706 in communication with communication interface 702 and user interface 704. Processing node 700 can be configured to determine a communication access node for a wireless device. Processing system 706 includes storage 708, which can comprise a disk drive, flash drive, memory circuitry, or other memory device. Storage 708 can store software 710 which is used in the operation of the processing node 700. Storage 708 may include a disk drive, flash drive, data storage circuitry, or some other memory apparatus. Software 710 may include computer programs, firmware, or some other form of machine-readable instructions, including an operating system, utilities, drivers, network interfaces, applications, or some other type of software. Processing system 706 may include a microprocessor and other circuitry to retrieve and execute software 710 from storage 708. Processing node 700 may further include other components such as a power management unit, a control interface unit, etc., which are omitted for clarity. Communication interface 702 permits processing node 700 to communicate with other network elements. User interface 704 permits the configuration and control of the operation of processing node 700.

Examples of processing node 700 include controller node 408 and gateway node 410. Processing node 700 can also be an adjunct or component of a network element, such as an element of access nodes 104, 106, 404, or 406. Processing node 700 can also be another network element in a communication system. Further, the functionality of processing node 700 can be distributed over two or more network elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method for routing data traffic based on network conditions, the method comprising:
   monitoring network conditions in a communication network that comprises at least a first access node and a second access node in communication using a first communication link and a second communication link, wherein
      the first communication link comprises a first logical connection and a second logical connection, the first logical connection having end points that comprise the first access node and a processing node, and the second logical connection having end points that comprise the processing node and the second access node, and
      the second communication link comprises a third logical connection with endpoints that comprise the first access node and the second access node, and
   determining that the network conditions meet a criteria, wherein the network conditions comprise at least a utilization of the second communication link;
   assigning a first classification to a message when it is determined that the network conditions meet the criteria; and
   instructing the first access node to transmit the message over the first communication link to the second access node based on the first classification when the network conditions meet the criteria and to transmit the message over the second communication link to the second access node when the network conditions fail to meet the criteria.

2. The method of claim 1, further comprising:
assigning a second message a second classification when it is determined that the network conditions meet the criteria; and
instructing the first access node to transmit the second message over the second communication link based on the second classification when the network conditions meet the criteria.

3. The method of claim 1, wherein the network conditions further comprise one or more of a ratio of the utilization of the second communication link to a utilization of data bearer channels between the first access node and a plurality of wireless devices, and a number of communication links that communicatively link access nodes of the communication network.

4. The method of claim 1, wherein the network conditions further comprise at least one of a data utilization for the first access node, a resource block utilization for the first access node, a number of connections to wireless devices for the first access node, a mobility for the wireless devices in communication with the first access node, and a handover failure number for the first access node.

5. The method of claim 1, wherein the first communication link communicatively links the first access node to a processing node different from the second access node.

6. The method of claim 5, wherein messages transmitted over the first communication link are relayed to the second access node via the processing node.

7. The method of claim 1, wherein at least one of a message used to handover a wireless device from the first access node to the second access node and a message used to perform load balancing between the first access node and the second access node is assigned to the second classification.

8. The method of claim 1, wherein at least one of a communication link reset message, a failure report message, and an error message is assigned to the first classification.

9. The method of claim 1, wherein the message is assigned to the first classification based on a message type for the message, wherein the message type is associated with the first classification when the network conditions meet the criteria.

10. The method of claim 9, further comprising:
determining that the network conditions meet a second criteria different from the criteria and that the network conditions fail to meet the criteria;
assigning messages of the message type to the second classification when it is determined that the network conditions meet the second criteria, wherein the message type is associated with the second classification when the network conditions meet the second criteria and the network conditions fail to meet the criteria; and
instructing the first access node to transmit messages of the first classification over the first communication link and messages of the second classification over the second communication link when the network conditions meet the second criteria and the network conditions fail to meet the criteria.

11. The system of claim 1, wherein each of the first access node and second access node comprises a backhaul connection to the communication network, the backhaul connection for the first access node being an S1 link over a wired medium with end points comprising the communication network and the first access node and the backhaul connection for the second access node being an S1 link over a wired medium with end points comprising the communication network and the second access node.

12. A system for routing data traffic based on network conditions, the system comprising:
a controller with a processor and memory storing instructions, the instructions configuring the controller to:
monitor network conditions in a communication network that comprises at least a first access node and a second access node in communication using a first communication link and a second communication link, wherein
the first communication link comprises a first logical connection and a second logical connection, the first logical connection having end points that comprise the first access node and a processing node, and the second logical connection having end points that comprise the processing node and the second access node, and
the second communication link comprises a third logical connection with endpoints that comprise the first access node and the second access node, and
determine that the network conditions meet a criteria, wherein the network conditions comprise at least a utilization of the second communication link;
assign a first classification to a message when it is determined that the network conditions meet the criteria; and
instruct the first access node to transmit the message over the first communication link to the second access node based on the first classification when the network conditions meet the criteria and to transmit the message over the second communication link to the second access node when the network conditions fail to meet the criteria.

13. The system of claim 12, wherein the controller is further configured to:
assign a second message a second classification when it is determined that the network conditions meet the criteria; and
instruct the first access node to transmit the second message over the second communication link based on the second classification when the network conditions meet the criteria.

14. The system of claim 12, wherein the network conditions further comprise a ratio of the utilization of the second communication link to a utilization of data bearer channels between the first access node and a plurality of wireless devices.

15. The system of claim 12, wherein the first communication link communicatively links the first access node to a processing node different from the second access node.

16. The system of claim 15, wherein messages transmitted over the first communication link are relayed to the second access node via the processing node.

17. The system of claim 12, wherein at least one of a message used to handover a wireless device from the first access node to the second access node and a message used to perform load balancing between the first access node and the second access node is assigned to the second classification.

18. The system of claim 12, wherein the message is assigned to the first classification based on a message type for the message, wherein the message type is associated with the first classification when the network conditions meet the criteria.

19. The system of claim 18, wherein the controller is further configured to:
- determine that the network conditions meet a second criteria different from the criteria and that the network conditions fail to meet the criteria;
- assign messages of the message type to the second classification when it is determined that the network conditions meet the second criteria, wherein the message type is associated with the second classification when the network conditions meet the second criteria and the network conditions fail to meet the criteria; and
- instruct the first access node to transmit messages of the first classification over the first communication link to the second access node and messages of the second classification over the second communication link to the second access node when the network conditions meet the second criteria and the network conditions fail to meet the criteria.

20. A method for routing data traffic based on network conditions, the method comprising:
- monitoring network conditions in a communication network that comprises at least a first access node and a second access node in communication using a first communication link and a second communication link, wherein
  - the first communication link comprises a first logical connection and a second logical connection, the first logical connection having end points that comprise the first access node and a processing node, and the second logical connection having end points that comprise the processing node and the second access node, and
  - the second communication link comprises a third logical connection with endpoints that comprise the first access node and the second access node, and
- determining that the network conditions meet a criteria, wherein the network conditions comprise at least a utilization of the second communication link;
- assigning one of a first classification and a second classification to a message when it is determined that the network conditions meet the criteria; and
- instructing the first access node to transmit messages of the first classification over the second communication link to the second access node and to transmit messages of the second classification over the first communication link to the second access node.

* * * * *